United States Patent [19]

Mashimo et al.

[11] Patent Number: 4,460,265
[45] Date of Patent: Jul. 17, 1984

[54] CAMERA SYSTEM WITH CAMERA MOUNTED DRIVE

[75] Inventors: Yukio Mashimo, Kanagawa; Tomonori Iwashita; Toshikazu Ichiyanagi, both of Tokyo; Hidehiko Fukahori, Kanagawa; Masahisa Fujino; Akio Sunouchi, both of Tokyo, all of Japan

[73] Assignee: Canon Kabushiki Kaisha, Tokyo, Japan

[21] Appl. No.: 384,261

[22] Filed: Jun. 2, 1982

[30] Foreign Application Priority Data

Jun. 11, 1981 [JP] Japan .................................. 56-90030

[51] Int. Cl.³ .............................................. G03B 1/18
[52] U.S. Cl. ..................................... 354/448; 354/484; 354/173.1
[58] Field of Search ................. 354/43, 44, 60 R, 171, 354/173, 268, 270, 271, 295, 274, 266, 448, 484, 173.1, 173.11

[56] References Cited

U.S. PATENT DOCUMENTS 4,190,344 2/1980 Ishiguro et al. ................ 354/268 X
4,206,987 6/1980 Sunouchi et al. ............... 354/173 X Primary Examiner—William B. Perkey
Attorney, Agent, or Firm—Toren, McGeady and Stanger

[57] ABSTRACT

In the disclosed camera system, a spring arrangement to drive an automatic exposure mechanism of a camera and a magnet arrangement to control starting and stopping of the AE mechanism of the camera are provided within an electric drive device, and the automatic exposure control of the camera is carried out by mounting the electric drive device on the camera. Facilities, when energized by a power supply, are set to supply driving power to a motor for cocking the shutter, and an arrangement supplies power from the power source to the magnet arrangement for actuating the magnet arrangement. The present invention eliminates disadvantages of prior camera systems, namely, inferior response characteristic of the magnet and erroneous operations by the release action, and a large number of connecting terminals.

14 Claims, 15 Drawing Figures (a)

(b)

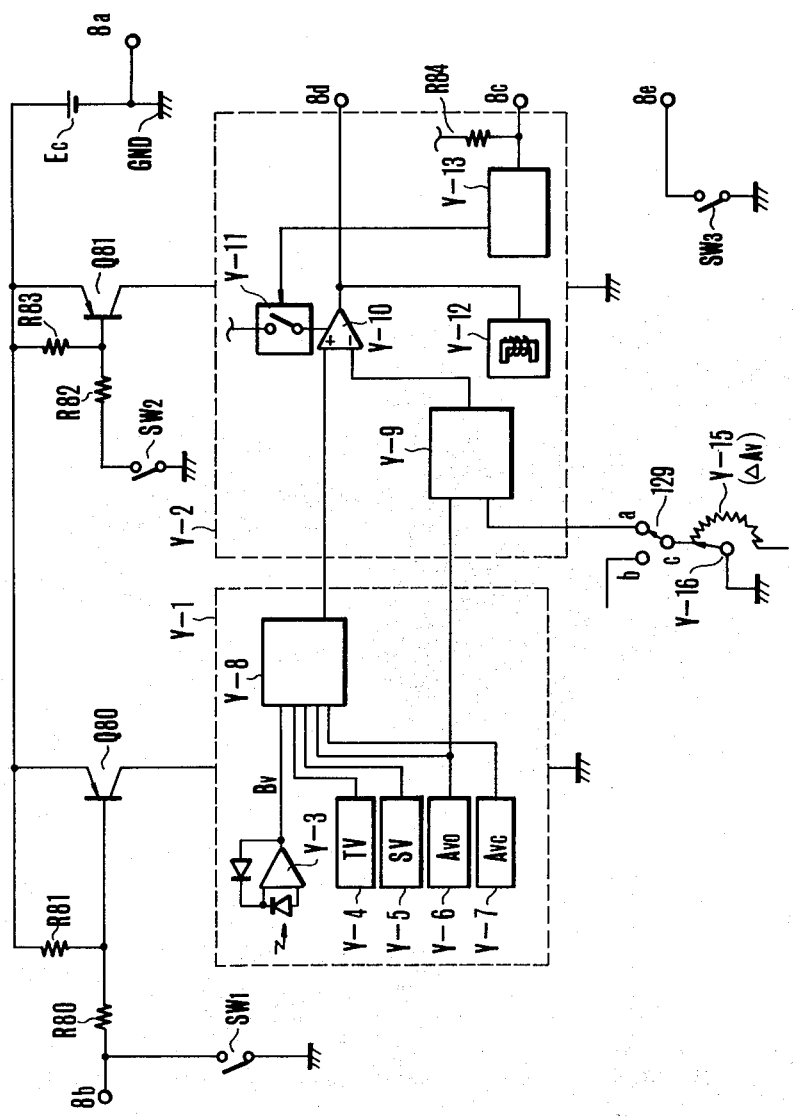
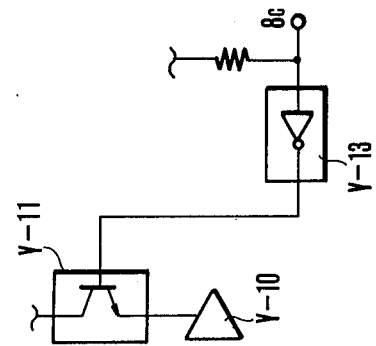
FIG.13
FIG.14

CAMERA SYSTEM WITH CAMERA MOUNTED DRIVE

BACKGROUND OF THE INVENTION

1. Field of the Invention

The present invention relates to a camera system, particularly one which can perform an automatic exposure control of the shutter time preference type by combining a camera and an electric drive device.

2. Description of the Prior Art

A camera of the above-mentioned type is disclosed by publically available Japanese Patent Application No. Sho 54-28134. In this kind of a conventional camera, a driving arrangement [such as a spring] to drive an AE [automatic exposure control] mechanism of a camera, and a magnet to initiate and stop an operation of the AE mechanism are provided within an electric drive device. A film winding motor within the electric drive device energizes the driving arrangement (e.g. spring) before starting to photograph. The magnet is activated as the photograph is started, and the AE mechanism is driven by the energized force of the driving arrangement, and when the diaphragm reaches an appropriate aperture value, the magnet is activated for stopping the drive of the AE mechanism. In such conventional type of camera, a power source battery of the camera is used as a driving power for the magnet. Ordinarily in a magnet the higher an impressed voltage is, the higher a quicker response characteristic can be obtained, and if the magnet is driven by the power source battery of the camera, the response characteristic becomes slower. Therefore, even if the diaphragm is regulated to an appropriate aperture by an AE mechanism, the magnet cannot be activated immediately, and an aperture control operation by the AE mechanism cannot be stopped without the delay in response of the magnet. This causes exposure errors (a first disadvantage).

Also, in the aforementioned type of a camera system, the magnet to control the initiation and stopping of the AE mechanism is provided within the electric drive device. Hence, it is necessary to transmit a signal for effecting an operational control of the magnet from the camera, and signal transmitting terminals for an initiating signal and a stopping signal are required for transmitting these signals to an electric driving device from the camera. This results in the shortcoming of an increased number of terminals compared to an ordinary camera system (a second disadvantage).

Further, in this type of a camera system, the first disadvantage may possibly be eliminated by loading the electric drive device with a battery having a comparatively high potential and using this battery as a driving power source for the aforementioned magnet. However, in this case, the release action can occur only when the magnet can be driven by the power source of the electric driving device. That is, when the shutter button of the camera is pressed down before driving of the magnet by the power source of the electric drive device becomes possible, the magnet will not be activated and while the shutter release is performed, the AE control will not be initiated. This constitutes a disadvantage. This fact will not constitute a problem when the above-mentioned magnet is provided within the camera and a power source of the camera is used as the driving power for this magnet as in a contentional type of camera, because power supply to the magnet by the release action, etc. can be easily effected. But in the aforementioned type of a camera system, the magnet is provided within the electric drive device and at the same time, the power source of the electric drive device is used as a power source without any frictional relationship with the camera. Therefore the above-mentioned fact constitutes a disadvantage (a third disadvantage).

Also, in a camera system of the type disclosed in the above-mentioned Japanese Patent Application, the AE mechanism is driven by a driving arrangement (spring) that actuates a slider which slides up and down for operating the AE mechanism of the camera. Therefore, it is necessary to provide a hole to insert the slider for transmitting the up and down movement of the slider to the camera. This introduces the problem that the dust preventive characteristic and the waterproof characteristic become inferior (a fourth disadvantage).

SUMMARY OF THE INVENTION

An object of the present invention is to use a power source of an electric driving device as a driving power source to drive a magnet in the above-mentioned type of a camera system, thereby eliminating the above-mentioned first disadvantage.

Another object of the present invention is to provide a multiplex arrangement of control signals for a magnet which transmits the signals from the camera to an electric drive device. That is, the above-mentioned signals for initiation and for stopping are transmitted from the camera to the electric drive device through a common terminal or terminals, thus eliminating the above-mentioned second disadvantage.

Further, another object of the present invention is to provide a safety circuit to prohibit the release action until supply of the driving power to the magnet becomes possible, so as to eliminate the aforementioned third disadvantage.

Still another object of the present invention is to provide a rotating member which rotates in response to the power stored in the driving arrangement (spring) for activating the AE mechanism of a camera with the rotating movement of the member, thus eliminating the aforementioned fourth disadvantage.

Further objects of the present invention will be made clear from the descriptions of embodiments hereinafter set forth with reference to the attached drawings.

BRIEF DESCRIPTION OF THE DRAWINGS

FIGS. 7 to 10 illustrate a wind up mechanism of the electric drive device shown in FIG. 1 and the AE mechanism, wherein FIG. 7 is a plan view illustrating the wind up completion position, and FIG. 8 is a plan view illustrating the state in which the AE mechanism is being driven for setting an aperture of a lens, while FIG. 9 is a plan view showing a state in which the AE mechanism has set the aperture of the lens, and FIG. 10 is a plan view illustrating the wind up mechanism and the AE mechanism when they in the course of a wind up operation.

FIG. 13 is a block diagram of the camera's main body shown in FIG. 1.

FIG. 14 is a circuit diagram showing an example of the switch current Y-11 and discrimination circuit Y-13 shown in FIG. 13.

DETAILED DESCRIPTION OF THE PREFERRED EMBODIMENT

Figure 1:
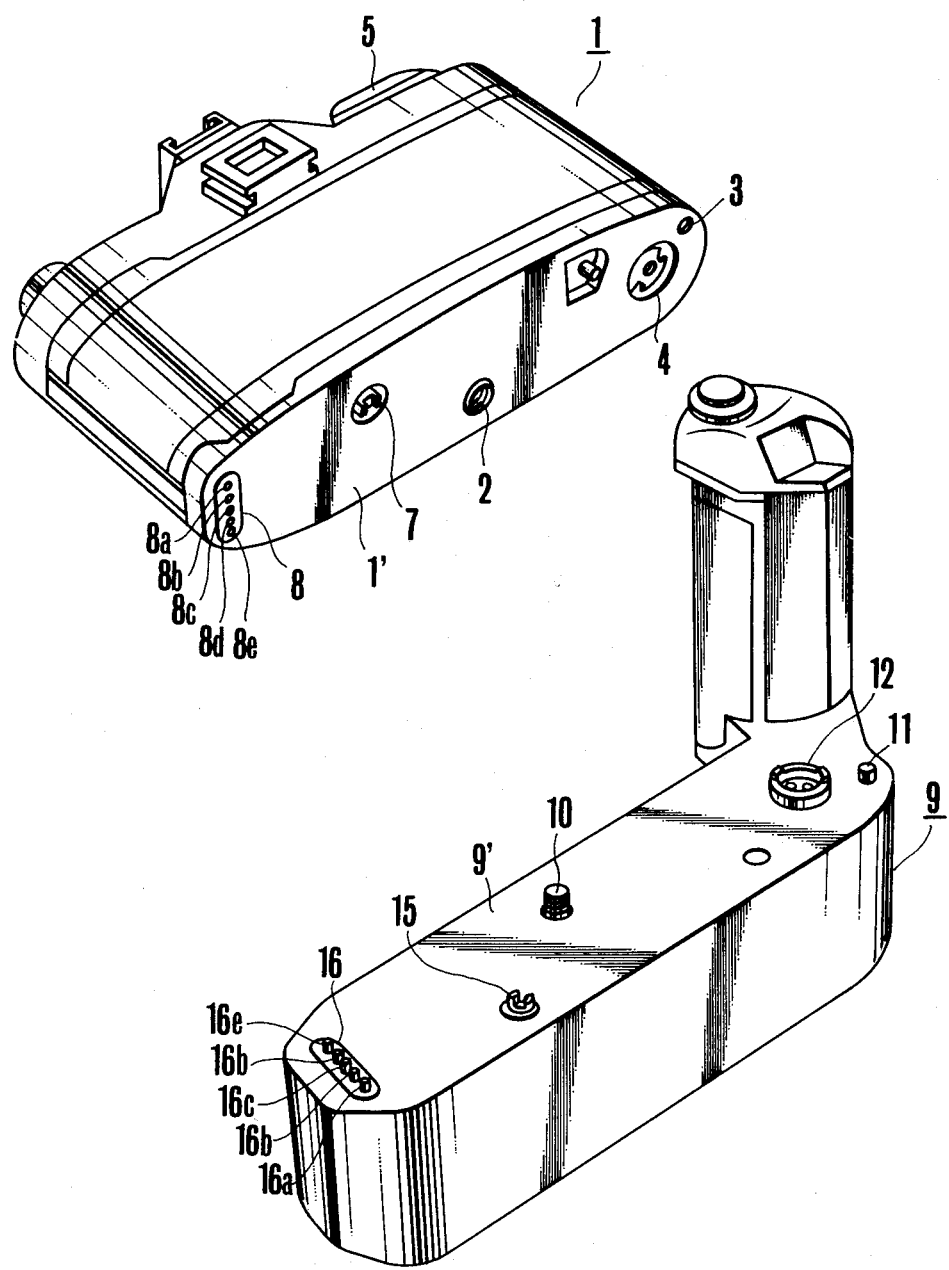
FIG. 1 is a perspective view of the external appearance of a camera's body with an electric driving device, and illustrates one embodiment of the present invention.

Now an example of the present invention shall be explained referring to the drawings.

FIG. 1 shows the external appearance of a camera's main body having an AE mechanism and an electric driving, i.e. drive, device as an accessory, which together constitute an electrically driven camera. In FIG. 1, the camera's main body 1 is constructed to receive an electric driving device at a lower plane 1' thereof. A mounting screw of the electric driving device is adapted to be screwed into a tripod screw hole 2 to fix the device. Element 4 is a wind up coupler to which a wind up coupler of the electric driving device is coupled. Member 5 is a wind up blower for a manual wind up. An AE coupler 7 is arranged to be coupled to an aperture setting member of a lens as will be described below, and at the same time an AE coupler of the electric driving device is coupled thereto. A terminal 8 on the camera body includes five contacts, 8a, 8b, 8c, 8d and 8e.

The assembly 9 is the electric driving device and forms an upper plane 9' which is to be attached to the lower plane 1' of the camera main body 1. A mounting screw 10 is threaded into the tripod screw hole 2. A guide pin 11 engages the guide hole 3 in the lower plane of the camera for establishing the abovementioned positioning. A wind up coupler 12 is coupled with the wind up coupler 4 on the camera to transmit the driving force of a motor to the camera body to effect a film wind up. An AE coupler 15 is coupled to the AE coupler 7 on the camera to transmit the spring force within the electric driving device for driving the diaphragm of the lens. A terminal 16 on the electric driving device includes five contacts, 16a, 16b, 16c, 16d and 16e and is electrically connected to the terminal 8 on the camera side for transmission of various signal.

The camera 1 and the electric driving device 9 are fixed to each other by threading the mounting screw 10 into the screw hole 2, thus unifying them so that they function as an electrically driven camera.

FIGS. 2 to 13 are drawings to show the main mechanism and circuits of the present invention. FIGS. 2 to 6 show an arrangement of the camera, in which the member 101 is an aperture signal lever. As a coupler gear 117 is rotated, an aperture preset ring 123 of a lens is driven to a computed appropriate aperture value against the force of an aperture preset ring return spring 124. A swing arm 102, one end of which is rotatably supported at a base plate 112, has another which is rotatably supported at the aperture signal lever 101. The swing arm 102, a cam gear 105, and the aperture signal lever 101 form a link mechanism. A movable axis 103 serves to connect the aperture signal lever 101 and the swing arm 102 in a rotatable manner. Member 104 is a swing arm axle to axially support the swing arm 102 at a base plate 112 in a rotatable manner. Member 105 is a cam gear, axially supported at an axle 108 mounted on the base plate 112 in a rotatable manner, and at the same time transmits a driving force of the coupler gear 117 to produce linear movement of a fore end 101a of the aperture signal level 101 corresponding to a rotating angle of the gear 117. The cam gear 105 also converts an aperture position of the fore end 101a of the aperture signal lever to an electrical signal with a fixed aperture signal brush 107. An aperture signal lever axle 106 serves to movably connect the apertures signal lever 101 and the cam gear 105, and an aperture signal brush 107 serves to convert the aperture position of the fore end 101a of the aperture signal lever to an electric signal for electrically comparing the same with a compared appropriate aperture value. Member 109 is a charge gear being axially supported at an axle 110 mounted on the base plate 112 in a rotatable manner and transmitting a force of the coupler gear only in a driving direction. An aperture information resistance substrate 111 produces an electric signal corresponding to an aperture position of the fore end 101a of the aperture signal lever by the aperture signal brush 107. An aperture signal lever spring 113 has a weaker force than that of the aperture preset ring return spring 124 and has the aperture preset ring 123 follow the aperture signal lever. Member 114 is a mirror box which houses a mirror, a mirror driving mechanism, etc. and at the same time becomes a dark box as the mirror extends. The box 114 has the base plate 112 fixed thereto. Member 115 is a sector gear being axially supported at an axle 118 mounted on the mirror box 114 in a rotatable manner and is charged counterclockwise by a sector gear return spring 119, and at the same time transmitting a force of the coupler gear 117 to the charge gear 109 only in a driving direction of the gear 117. Member 120 is a spring hook. A two step gear 116 is axially supported at an axle 121 mounted on the mirror box 114 in a rotatable manner. A first gear 116a meshes with the above-mentioned sector gear and at the same time a second gear 116b meshes with the coupler gear 117. The coupler gear 117 is axially supported at an axle 122 mounted on the mirror box 114 in a rotatable manner and at the same time is made integral with the AE coupler 7 and a recess 7a for coupling with the AE coupler 15 of the electric driving device 9.

Member 123 is an aperture preset ring which controls an aperture of a lens not shown in the drawing, and is cocked in a direction reverse to the driving direction of the aperture signal lever 101 by the aperture preset ring return spring 124. Member 125 is a spring hook for the aperture preset ring return spring. A diaphragm ring 126 serves for manually setting an aperture in a manual mode or an aperture preference automatic exposure mode (a system to set an aperture beforehand and to automatically set a shutter time according to the brightness of an object), and when the ring 126 is set of an automatic position A, the camera can be switched to an AE (a shutter time preference automatic exposure) mode. An automatic change over pin 127 transmits information that the lens is at an automatic position from the lens to the camera, and a mark 128 indicates an aperture set on the aperture ring 126. Member 129 is a change over switch associated with the auto-manual change over pin. When the aperture ring is at the automatic position, contact pieces 129a and 129c are in a conductive state, and when the aperture ring is in the manual position, contact pieces 129b and 129c are in a conductive state. A stopper 130 serves to determine a coupler rotation expectation position for the coupler gear 117 and is mounted on the mirror box 114.

Next, explanations shall be made on an arrangement of a mechanism of an electric driving device.

In the electric drive device of FIGS. 7 to 10, member 201 is a driving disc coupled with a film wind up motor not shown in the drawing and rotated counterclockwise by the driving force of a motor. A wind up cam 202 is fixedly provided on the driving disc 201 and rotated integrally with the driving disc by the driving force of the wind up motor. The wind up coupler 12 explained in FIG. 1 is provided in such a manner as to rotate integrally with the driving disc 201 and the wind up cam 202. A charge lever 203 is axially supported at a fixed axle 204 in a rotatable manner and at the same time has its position restricted in the counterclockwise direction by a spring 205. Member 206 is wind up roller axially supported at an axle 207 fixedly provided at a lower plane of the charge lever 203 in a rotatable manner, and at the same time having its end plane pressure contacted against an end plane of the wind up cam 202 by the spring 205. Therefore, as the wind up cam 202 is rotated 180° counterclockwise by the driving motor, the charge lever 203 performs one swing movement. A hole perforated at a fore end 203a of the charge lever axially supports an axle 209 fixedly provided on a right hand end 208a of a connecting lever 208 in a rotatable manner. A sector charge lever 210 is axially supported at a fixed axle 211 in a rotatable manner and at the same time an axle 212 is fixedly provided at one end 210a thereof. On the other hand, a hole passes through the left hand end 208b of the connecting lever which is axially supported for rotation at the above-mentioned axle 202. Therefore, the charge lever 203, the connecting lever 208 and the sector charge lever 210 constitute a link mechanism. As the charge lever 203 performs a swing movement the sector charge lever 210 also performs a swing movement. A release charge lever 213 and a sector fastening lever 214 are independently and axially supported at a fixed axle 215 in a rotatable manner, and at the same time a spring 216 biases the release charge lever 213 counterclockwise and the sector fastening lever 214 clockwise. A pin 217 constitutes a stopper for the release charge lever 213. Also two pins 218, 219 are mounted on the connecting lever 208, and the pin 218 drives the release charge lever 213, wherein when the connecting lever 208 shifts to the left the pin 218 engages one end 213a of the release charge lever for rotating the release charge lever clockwise against the force of the spring 216. The pin 219 is a stopper for the connecting lever 208 in its return direction. Member 220 is a release driving lever and is axially supported at a fixed axle 221 in a rotatable manner and at the same time is charged clockwise by a spring 222. Member 223 is a release fastening lever axially supported at a fixed axle 224 in a rotatable manner and biased counterclockwise by a spring 225, and at the same time has an armature part 223a at its central section and a checking part 223b at its fore end. Element Mg4 is an initiation electromagnet. As power is supplied to the magnet, the armature part 223a of the release fastening lever is attracted thereto and the release fastening lever 223 is rotated clockwise against the force of the spring 225. Also the checking part 223b of the release fastening lever checks one end 220a of the release driving lever. A pin 226 mounted at the other end 220b of the release driving lever on its reverse side, engages one end 214a of the sector fastening lever 214 when the release driving lever 220 has its checking with the release fastening lever 223 released and the release driving lever 220 rotates clockwise in response to the force of the spring 222. Then the lever 214 is rotated counterclockwise against the force of the spring 216. Also the pin 226 engages the other end 213b of the release charge lever 213, and as the release charge lever rotates clockwise the release driving lever 220 is rotated counterclockwise against the force of the spring 222. A sector gear 227 is axially supported at the above-mentioned fixed axle 211 in a rotatable manner. Member 228 is a driving spring having a stronger force than that of the aperture preset ring return spring 124 of the lens mentioned above, and is spanned between a pin 229 fixedly provided on the sector gear 227 and a fixed pin 230 charges the sector gear 227 in the counterclockwise direction. A pin 231 is mounted on the reverse plane of the sector gear, and the pin 231 abuts on an arm part 210b of the sector charge lever 210 when said lever 210 swings clockwise to rotate the sector gear 227 clockwise to rotate the sector gear 227 clockwise against the force of the driving spring 228. One end of the square part 227a of the sector gear engages a checking part 214b of the sector fastening lever, thus restricting the counterclockwise rotation of the sector gear. A pin 232 acts as a stopper when the sector gear 227 performs a total rotation in the counterclockwise direction. A tooth part 227b of the sector gear meshes with an AE coupler gear 234 axially supported at a fixed axle 233 in a rotatable manner. The AE coupler is explained with respect to FIG. 1 and rotates integrally with the AE coupler gear 234, and at the same time has an absorbing mechanism in a thrusting direction for a known structure not shown in the drawing. A claw part 15 engages the AE coupler 7 (shown in FIGS. 1 and 2) of the camera. Member 235 is a first governor gear and is axially supported at a fixed axle 236 in a rotatable manner and at the same time has a small gear part 235a and a large gear part 235b, wherein the small gear part 235a engages the AE coupler gear 234. Member 237 is a second governor gear being axially supported at the fixed axle 238 in a rotatable manner and at the same time having a large gear part 237a and a small gear part 237b which is not shown in the drawing. The small gear part 237b meshes with the large part 235b of the first governor gear. A stop wheel 239 axially supported at a fixed axle 240 in a rotatable manner possesses a claw part 239a and a small gear part 239b not shown in the drawing. The small gear part 239b meshes with the large gear part 237a of the second governor gear. Therefore, when the sector gear 227 is rotated counterclockwise by the driving gear 228, the AE coupler 7 is rotatingly driven in the clockwise direction through the AE coupler 234. At the same time the stop wheel 239 is accelerated through the first governor gear 235 and the second governor gear 236 and is rotated counterclockwise. Member 241 is a stop claw axially supported at a fixed axle 242 in a rotatable manner and at the same time biased counterclockwise by a spring 243. Member 244 is a stop claw charge lever axially supported at a fixed axle 245 in a rotatable manner, and at the same time has a pin 246 mounted on one end 244a thereof and a pin 247 mounted at the other end 244b. The pin 246 abuts the cam part 210c of the above-mentioned sector charge lever 210 when said lever 210 swings clockwise. Thus, the stop claw charge lever 244 is rotated counterclockwise. Also, the pin 247 mounted on the other end of the stop claw charge lever engages one end 241a of the above-mentioned stop claw, and the stop claw 241 is rotated clockwise against the resistance of the spring 243 as the stop claw charge lever is rotated counterclockwise. A stop claw fastening lever 248 is axially supported at a fixed axle 249 in a rotatable manner and at the same time is biased clockwise by a spring 250. One end 248a of said stop claw charge lever engages a checking part 241b of the stop claw and at the same time an armature part 248b is provided at the other end of the stop claw charge lever. The armature part 248b of the stop claw fastening lever is attracted to a setting electromagnet Mg1 as power is supplied thereto. The stop claw fastening lever 248 then rotates counterclockwise against the force of the spring 250. This releases the engagement between the checking part 241b of the stop claw and one end 248a of the stop claw fastening lever.

Figure 2:
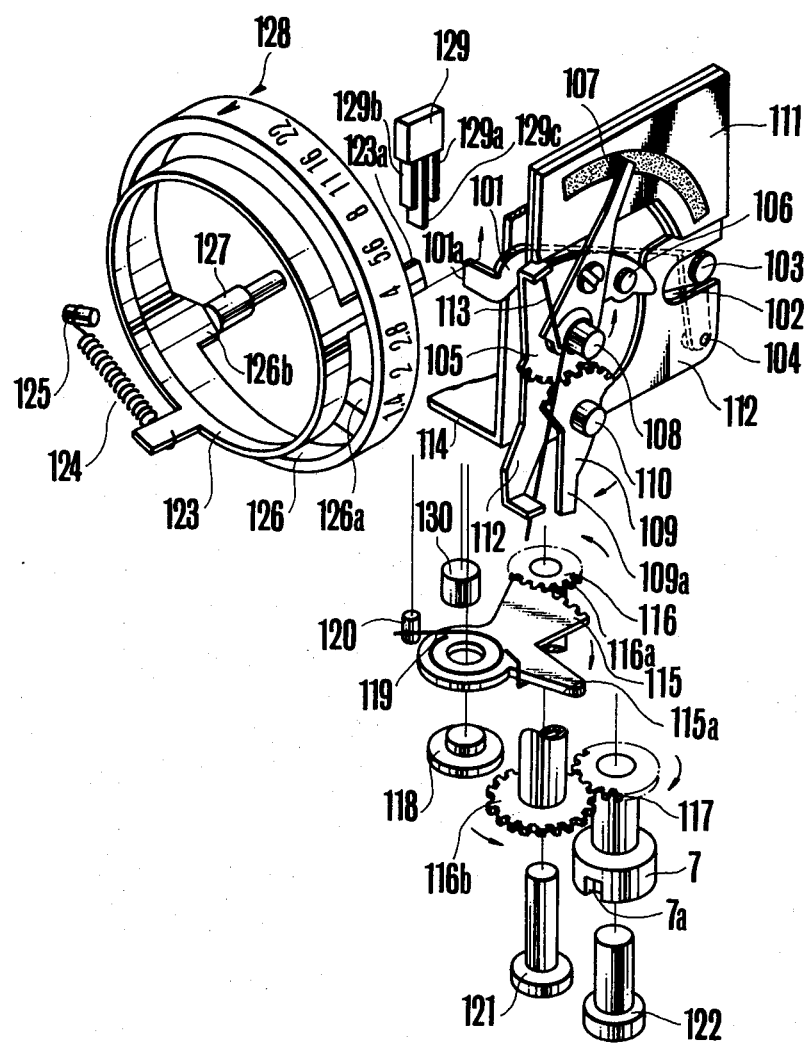
FIG. 2 is an exploded perspective view of an AE mechanism of the camera shown in FIG. 1.
Figure 3:
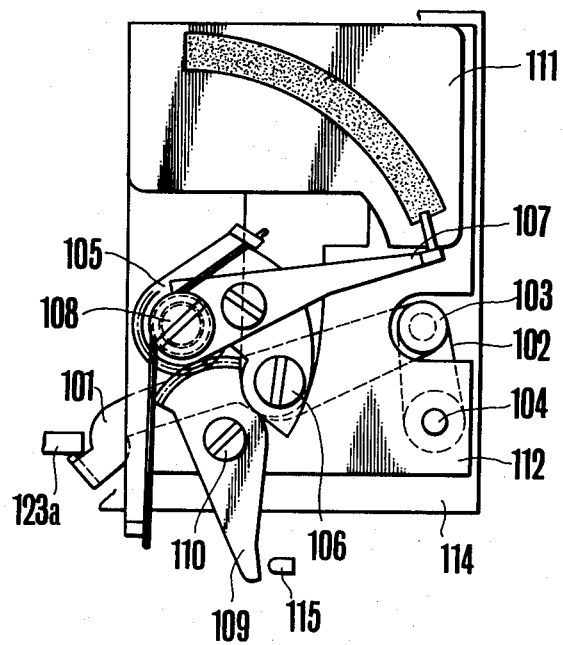
FIG. 3 is a side elevation of an aperture setting mechanism shown in FIG. 2 when the wind up is completed.
Figure 4:
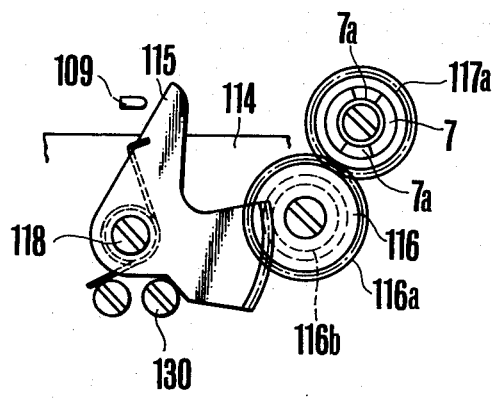
FIG. 4 is a plan view of FIG. 3 as viewed from the bottom.
Figure 7:
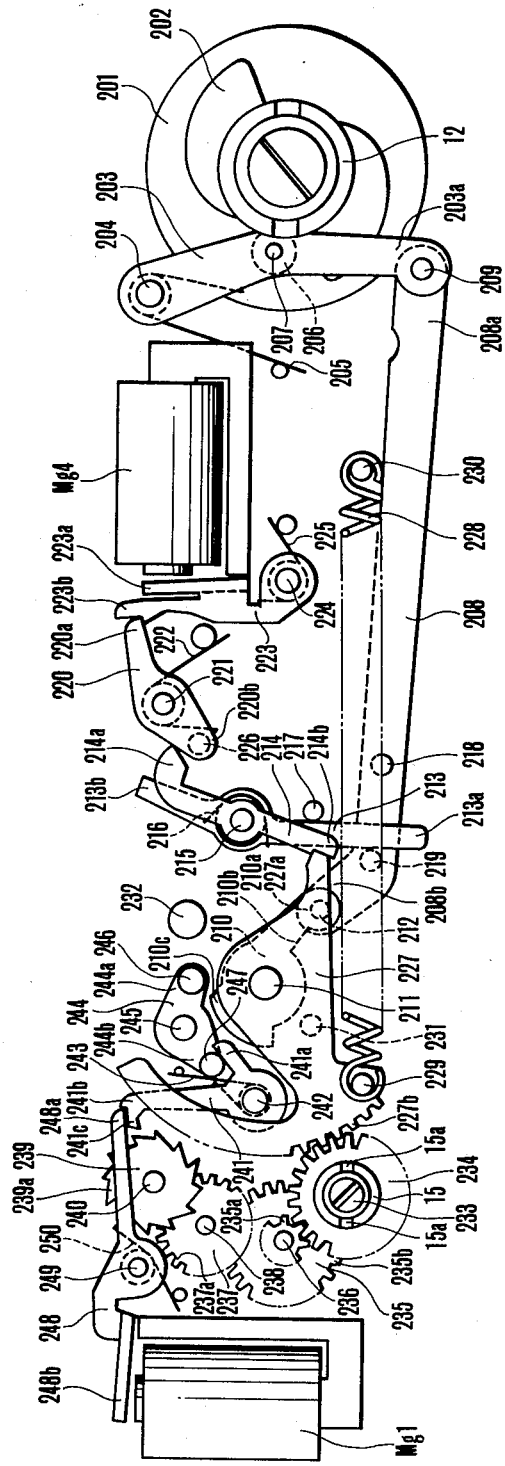

In operation, it is first supposed that the camera and the electric driving device are in a state in which winding is completed as shown in FIGS. 3, 4 and 7. When AE photography (a shutter time preference automatic exposure) is performed in a camera having an electric driving device mounted thereon, the mark "A" of the aperture ring 126 is first matched with the aperture mark 128 in FIG. 2. Then the auto-manual change over pin 127 rides over the cam part 126b of the aperture ring and protrudes back so that contact pieces 129a and 129c of the change over switch 129 contact each other. At the same time the projection part 126a of the aperture ring 126 rotatingly moves clockwise and said projection part 126a shifts to a position outside of an operating zone of the projection part 123a of the aperture preset ring 123. Also, the projection part 123a of the aperture signal lever is rotated clockwise by the aperture preset ring return spring 124. The aperture signal lever 101, which is biased by a spring with a weaker force than that of the return spring 124 and which has its fore end 101a abutting the projection part 123a of the aperture signal lever, is shifted to a downward aperture control position, so that a driving control of the projection part 123a of the aperture preset ring by the aperture signal lever 101 can be freely achieved.

Figure 8:
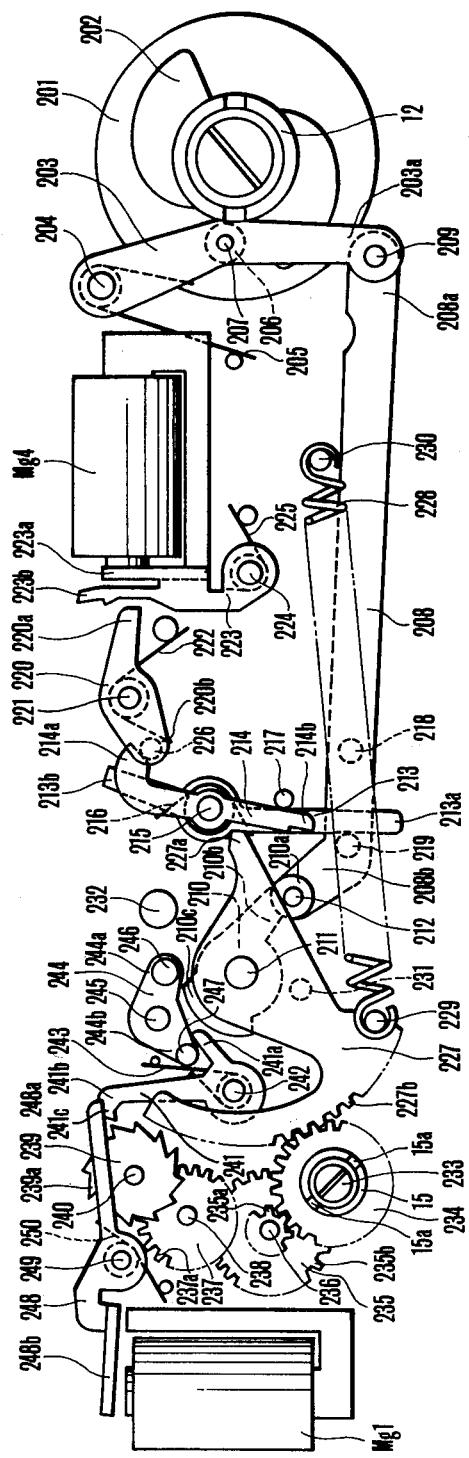

When a camera release button not shown is now pressed, the initiation magnet Mg4 within the electric driving device shown in FIG. 7 is activated first and the armature part 223a of the release fastening lever is attracted to the magnet Mg4, the release fastening lever 223 rotates clockwise against the resistance of the spring 225. Then the engagement between the checking part 223b of the release fastening lever and one end 220a of the release driving lever is released, and the release driving lever 220 rotates clockwise in response to the spring 222 and the pin 226 planted on the other end 220b of the lever abuts one end 214a of the sector fastening lever. Since the spring 216 of the sector fastening lever is set to be weaker than the spring 222, the sector fastening lever 214 is rotated counterclockwise by the release driving lever 220 against the force of the spring 216. Then the engagement between the checking part 214b of the sector fastening lever and one end 227a of the sector gear 227 is released, and the sector gear 237 is released, and the sector gear 227 is rotated counterclockwise by the force of the driving spring. The AE coupler gear meshing with the sector gear and the AE coupler 15 now rotate clockwise and at the same time the first governor gear 235, the second governor gear 237 and the stop wheel 239 also rotate (FIG. 8). When the AE coupler 15 rotates clockwise, the AE coupler 7 of the camera shown in FIG. 2 or FIG. 4 has the recess 7a engage the claw part 15a of the coupler 15 so as to rotate clockwise in the direction of the arrow. Now the sector gear 115 rotates in the arrow's direction by virtue of the two step gear 116. Then as the fore end 115a of gear 115 drives the fore end 109a of the charge gear 109 the charge gear 109 rotates in the arrow's direction, and the cam gear 105 meshing with the charge gear is also rotated to the other arrow's direction. Then the cam gear 105, the swing arm 102 and the aperture signal lever 101 constituting a link mechanism are operated, and the aperture signal lever 101 is driven upwards. The aperture preset ring 123 having its fore end 123a abutting the fore end 101a of the lever 101 is then rotated counterclockwise against the resistance of the aperture preset ring return spring 124. Also, when the cam gear 105 rotates, the aperture signal brush 107 also rotates counterclockwise, and the resistance value of the aperture information resistance substrate 111 varies corresponding to the movement of the cam gear 105 that is a rotating angle of the aperture signal lever 101. When the resistance value reaches a prescribed value (a value corresponding to an aperture opening required to obtain an appropriate exposure), the setting magnet Mg1 is activated by a circuit to be described.

Figure 5:
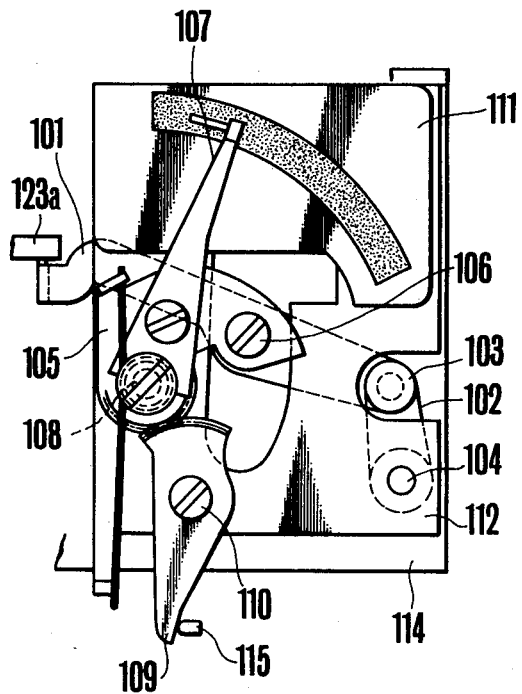
FIG. 5 is a side elevation of the aperture setting mechanism shown in FIG. 2 immediately after an aperture setting has been completed.
Figure 6:
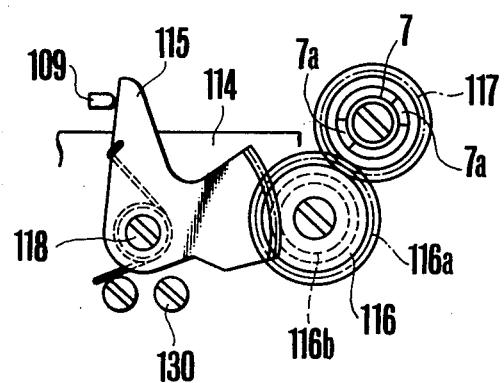
FIG. 6 is a plan of FIG. 5 as viewed from the bottom.
Figure 9:
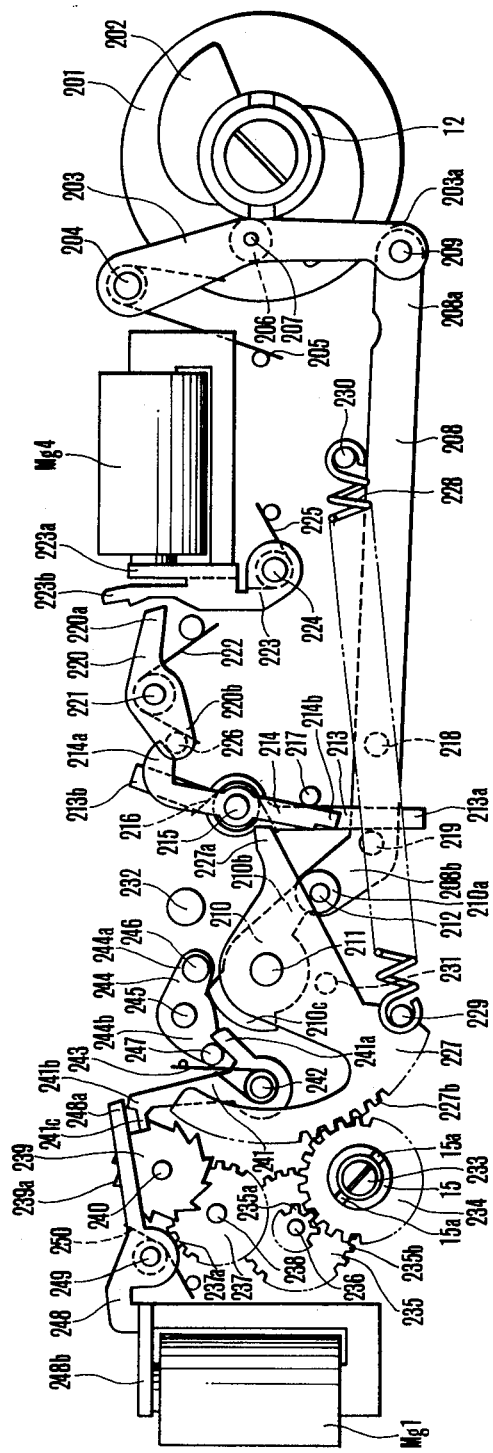

Then, as shown in FIG. 7, as the armature part 248b of the stop claw fastening lever is attracted, the stop claw fastening lever 248 rotates counterclockwise against the force of the spring 250. The engagement between one end 248a thereof and the checking part 241b of the stop claw is then released. The stop claw 241 rotates counterclockwise in response to the force of the spring 243 and the claw part 241c drops in the claw part 239a of the stop wheel for instantly stopping the rotation of the stop wheel (FIG. 9). When the rotation of the stop wheel stops, the second governor gear 237 and the first governor gear 235 as well as the AE coupler gear 234 and the sector gear 235, meshing with each other, stop rotation. At the same time the AE coupler 7, the coupler gear 117, the two step gear 116, the sector gear 115, the charge gear 109, the cam gear 105, the swing arm 102 and the aperture signal lever 101 on the camera coupled together by the AE coupler 15 also stop (FIG. 5, FIG. 6). Therefore, since the aperture preset ring 123 of the lens also stops, the preset ring 123 stops at an aperture opening necessary to obtain an appropriate exposure.

Figure 10:
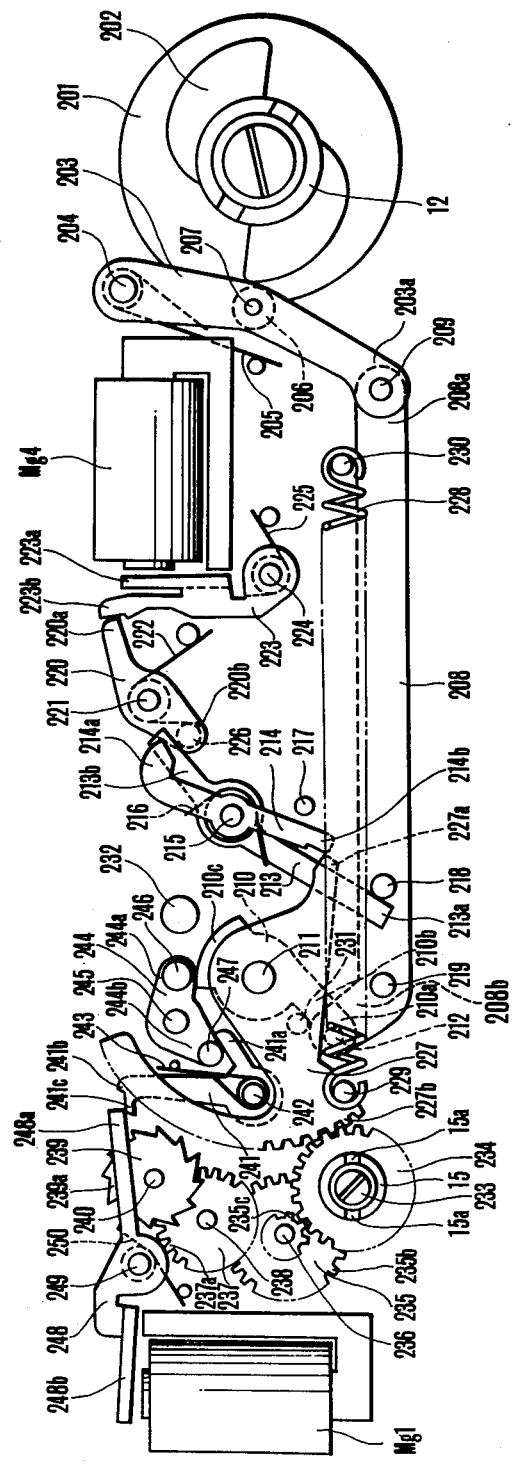

When a shutter release is performed by a circuit to be described, a stop down action of the aperture, a mirror up, and a shutter run are executed by a known method. Then as an exposure is completed, the motor M starts a rotation in response to a circuit to be described, and the driving disc 201 rotates counterclockwise direction in response to the driving force of the motor. Then, the wind up coupler 12 also rotates to wind the film. The shutter is cocked, etc. through the wind up coupler 4 of the camera. The wind up cam 202 also rotates counterclockwise as the driving disc 201 rotates. Therefore the wind up roller 206 is pushed out to the left and the charge lever 203 rotates clockwise against the force of the spring 205. Thus, since the charge lever 203, the connecting lever 208 and the sector charge lever 210 form a link mechanism, the sector charge lever 210 also rotates clockwise. Then, first the cam part 210c of the sector charge lever abuts the pin 246 mounted on one end 244a of the stop claw charge lever, to rotate the lever 244 counterclockwise. Then, the pin 247 mounted on the other end 244b of the stop claw charge lever pushes one end 241a of the stop claw, and the stop claw 241 rotates clockwise against the force of the spring 243 to release the checking of the wheel 239. When the driving disc 201 rotates and the wind up cam 202 also rotates counterclockwise, the sector charge lever 210 rotates further in the counterclockwise direction, and the arm part 210b thereof abuts the pin 231 mounted on the sector gear 227 and rotates the sector gear 227 clockwise while charging the driving spring 228. Then, the AE coupler 234 rotates counterclockwise and at the same time the first governor gear 235, the second governor gear 237 and the stop wheel 239 also rotate. As the charge lever 203 rotates clockwise, the connecting lever 208 shifts to the left, and the pin 218 mounted on the lever abuts one end 213a of the release charge lever to rotate the lever 213 clockwise against the force of the spring 216. Then, the other end 213b of the release charge lever abuts the pin 226 mounted on the other end 220b of the release driving lever to rotate the lever 220 clockwise against the force of the spring 222 (FIG. 10). Also, when the AE coupler gear 234 rotates counterclockwise, the AE coupler 15 also rotates counterclockwise, so that the AE coupler 7 of the camera being coupled therewith also rotates counterclockwise (the direction opposing the arrow) and the sector gear 115 also rotates in the direction opposing the arrow through the two step gear 116. Then, since the charge gear 109 is biased in the direction opposing the arrow by the aperture preset ring return spring 124 through the cam gear 108, the swing arm 102, the aperture signal lever 101 and the aperture preset ring 123 of the lens, the charge gear 109, the cam gear 108, the swing arm 102 and the aperture signal lever rotate in the direction opposing the arrow, and the aperture preset ring of the lens also rotates. And as the wind up roller 206 rides over the top dead center of the wind up cam 202, the charge lever 203 rotates counterclockwise in response to the spring 205, and the connecting lever 208 also moves to the right, so that the pins 219 and 217 abut the release charge lever 213 and stop there. The AE mechanisms of the camera and the electric driving device are placed in a charge completion state, and a condition shown in FIG. 3, FIG. 4 and FIG. 7 is secured. At this time a wind up mechanism of the camera not shown in the drawing is placed in a wind up completion state.

When a photograph is made in the aperture preference automatic exposure mode, the aperture ring 126 may be matched with the mark at positions other than "A". That is, when the aperture ring 126 is matched with the mark at a desired aperture value, the aperture preset ring 123 performs a following movement by the aperture preset ring return spring 124. Also, the fore end 123a of the aperture preset ring causes the aperture signal lever 101, which is biased by the aperture signal lever spring 113 that has a weaker force than that of the above-mentioned return spring in the driving direction, to follow. This shifts the aperture signal brush 107 to a position corresponding to a set aperture value and the information concerning the aperture value is produced as an electric signal by the aperture information resistance 111. Also as the aperture ring 126 is matched with the mark at positions other than "A", the automanual change over pin 127 moves forward and the contact pieces 129b and 129c of the changed over switch 129 are placed in conductive contact. By introducing the set aperture value into the circuit to be described, an aperture preference automatic exposure photograph is executed. Also, since the arrangement is such that the sector gear 115 and the charge gear 109 at this time are associated together in the driving direction, even if the AE coupler gear 117 is checked at a charging completion position when the electric driving device is mounted on the camera, the sector gear 115 will not block movement of the charge gear 109 associated with the aperture signal lever 101. Therefore, even when an automatic exposure photograph of the aperture preference type is taken, the aperture can be set manually by the aperture ring 126 while the electric driving device is left mounted on the camera.

Also in the above-mentioned structure, one end 109a of the charge gear and one end 115a of the sector gear at the AE mechanism within the camera are associated only in the driving direction. Therefore, regardless of the position of one end 109a of the charge gear associated with the fore end 126a of the aperture preset ring of the lens, when the electric driving device is not mounted, the sector gear 115 is set at a position abutting on the stopper 130 by the sector gear return spring 119. Hence the recess 7a of the AE coupler will be at a predetermined position. Therefore, if a rotating operation angle of the electric driving device is held at 36/number of claws of AE coupler (in this example the number of claw parts 15a is two, the angle will be 180°) or less, the claw parts will not engage erroneously regardless of the position of the phase of the electric driving device, such as the wind up completion state, charging state, etc.

Figure 11:
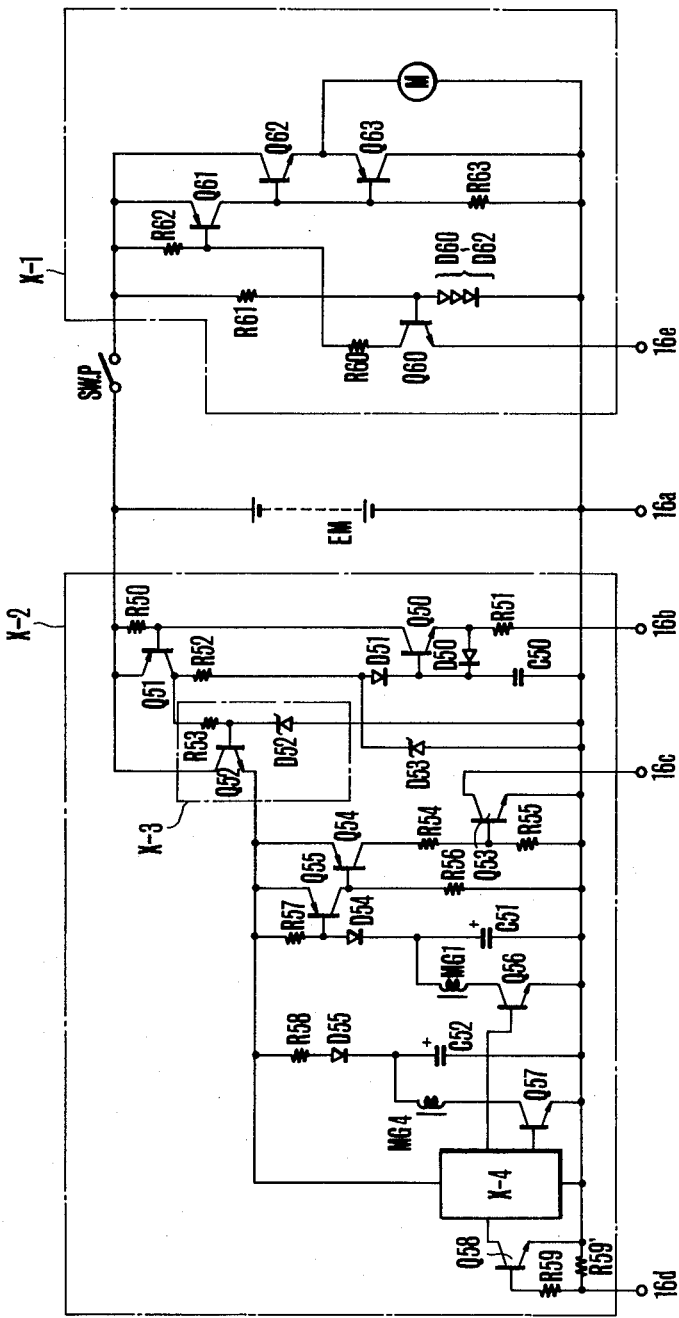
FIG. 11 is a control circuit diagram of the electric drive device shown in FIGS. 7 to 10.

The arrangement and an operation of the circuits of the camera and the electric driving device in FIGS. 11 to 14 are as follows. FIG. 11 is to show a control circuit of the electric driving device, wherein a circuit X-1 enclosed by broken lines is a wind up control circuit, and a circuit X-2 also enclosed by broken lines controls the drive of the AE control magnet.

The control circuits X-1 and X-2 of the electric driving device and the control circuit of the camera shown in FIG. 13 are connected by terminals 16a to 16e and terminals 8a to 8e. In FIG. 11, a power source battery EM (for example of 18 V) of the electric driving device is connected to the wind up control circuit X-1 through a power source switch SWP and to the magnet control circuit X-2 directly without a switch. In the wind up control circuit X-1, a transistor Q62 in series with a motor M is turned on and off by a transistor Q60 connected to the terminal 16e through a transistor Q61. A transistor 63 connected in parallel with the motor M is turned ON by a base current flowing through a resistor R63 when the transistor Q62 is OFF and serves to effect a control function of the motor M when the wind up action is completed. A base of the transistor Q60 is connected to a minus side of the battery through diodes D60 to D62 and to a plus side of the battery through a resistor R61, and the power source switch SWP. This transistor Q60 goes ON when the terminal 16e is connected to a terminal 16a connected to the minus side of the battery, thus turning the transistors Q61, Q62 ON through the resistor R60.

In the magnet control circuit X-2, a transistor Q50 goes ON when a terminal 16b is connected to the terminal 16a, and controls ON-OFF condition of a transistor Q51. A capacitor C50 to initiate the ON state of the transistor is connected to a base of the transistor Q50. The capacitor C50 is also connected to the terminal 16b through the diode D50 and the resistor R51 and to the transistor Q51 through the diode D51 and the resistor R52, respectively. A constant voltage diode D53 restricts the base potential of the transistor Q50 to a value below a prescribed level. A circuit X-3 enclosed by broken lines is a constant voltage circuit, and diode D52 is a constant voltage diode, while a transistor Q52 produces a constant voltage. This constant voltage diode D52 and the transistor Q52 are connected to the transistor Q51 through the resistor R53, and when the transistor Q51 is ON, the transistor Q52 turns ON to produce a constant voltage. A transistor Q53, which goes ON when a charging voltage to a magnet driving capacitor C51 reaches a prescribed value, is connected to the terminal 16c. A transistor Q54 turns transistor Q53 ON and OFF through a resistor R54. A resistor R56 arranged to cause flow of base current in the transistor Q54 is connected to a base of the transistor Q54. Member Q55 is a transistor to disable the transistor Q54, and the transistor Q55 prohibits the operation of the transistor Q54 while charging current flows to the above-mentioned magnet driving capacitor C51 through a resistor R57 and a diode D54. When a charging voltage across the capacitor C51 reaches a prescribed value and a current flowing through the resistor R57 reaches its lowest value the transistor Q55 turns OFF to enable the transistor Q54. The capacitor C51 is connected to the transistor Q52, which produces a constant voltage, through the resistor R57 and the diode D54, and the charging is done with a constant voltage. The setting magnet MG1 described with respect to FIGS. 7 to 10 is connected to the capacitor C51. A transistor Q56 drives the magnet MG1. Electromagnet MG4 is the initiation magnet explained with respect to FIGS. 7 to 10 and is connected to the driving capacitor C52. The capacitor C52 is connected to the transistor Q52 through the resistor R58 and the diode D55, and is charged with a constant voltage. Member Q57 is a transistor which drives the initiation magnet MG4. The circuit X-4 is a signal separation circuit which divides the multiplied signal used for aperture control and introduced into a terminal 16d as a control signal for the above-mentioned initiation magnet MG4 and a control signal for the setting magnet MG1. The circuit X-4 has outputs supplied to the magnet driving transistors Q57 and Q56 respectively. Details of the circuit X-4 are explained with respect to FIG. 12.

Figure 12:
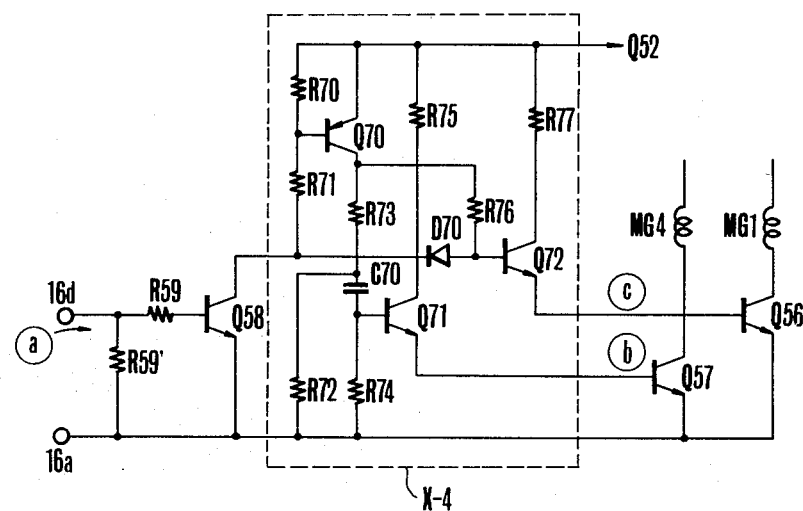
FIG. 12(a) is a detailed diagram of the signal separation circuit shown in FIG. 11.
FIG. 12(b) is a time chart of the circuit shown in FIG. 12(a).
Figure 12:
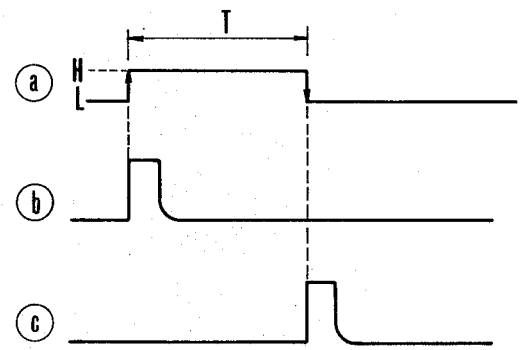

The signal separation circuit X-4 is connected to the terminal 16d through a transistor Q58 and a resistor R59. FIG. 12 is a schematic diagram illustrating the signal separation circuit X-4 in FIG. 11. FIG. 12(b) is a time chart to explain an operation.

In FIG. 12(a), the circuit X-4 is enclosed by broken line and transistors Q58, Q57, Q56 and magnets MG1, MG4, resistors R59 and R59' and terminals 16a, 16b are same as those represented by same members in FIG. 11. What is shown as Q72 is a transistor to control the transistor Q56 to drive the magnet MG1, and what is shown as Q71 is a transistor to control the transistor Q57 to drive the magnet MG4. The base of the transistor Q71 is connected to the transistor Q70 through the capacitor C70 and the resistor R73. The base of the transistor Q72 is connected to the transistor Q70 through a resistor R76 and to the transistor Q58 through a diode D70. The transistor Q58 goes ON as a signal is introduced at the terminal 16d and the transistor Q70 is turned ON through the resistor R71. Also the transistor Q58 lowers the base potential of the transistor Q72 through the diode D70 while it is ON, thereby turning off the transistors Q72, Q56. The plus side of the circuit of X-4 is connected to the transistor Q52 of FIG. 11 to supply a constant voltage. What are shown as R70 and R77 are current limiting resistors.

The operation of the circuit of FIG. 12(a) is explained with reference to the time chart of FIG. 12(b).

Graph (a) of FIG. 12 is a signal introduced into the terminal 16d, and (b) is an output signal of the transistor Q71, while (c) shows an output signal of the transistor Q72. First, when the signal of (a) is introduced into the terminal 16d and the signal voltage of (a) rises from a low level L to a high level H, a base current flows to the transistor Q58 through the resistor R59 and the transistor Q58 goes ON. As the transistor Q58 turns ON, a base current flows to the transistor Q70 through the resistor R71, and the transistor Q70 also goes ON. As the transistor Q70 turns ON, the transistor Q71 goes ON for a prescribed period of time determined by a time constant of the resistor R73 and the capacitor C70, to supply an output signal represented by (b) to the transistor Q57. Also, as the transistor Q70 goes ON, a current flowing through the resistor R76 flows into the transistor Q58 through the diode D70 while the transistor Q57 is ON. Therefore the transistor Q72 remains OFF and the output signal (c) of the transistor Q72 will have a low level.

When the input signal (a) of the terminal 16a drops to a low level L from a high level H, the transistors Q58, Q70 go OFF. When the transistor Q70 turns OFF the charge accumulated at the capacitor C70 when the transistor Q70 was ON passes through the circuit of the resistors R72, R74 and the circuit of the resistors R73, R76, the transistors Q72,Q56, and the resistor R74 and is discharged. This discharging current of the capacitor C70 turns the transistor Q72 ON for a prescribed period of time determined by a time constant of the discharging circuit to supply the output signal represented by graph (c) to the magnet driving transistor Q56.

As explained above, the signal separation circuit X-4 separates the input signal as shown by graph (a) of FIG. 12 into the output signal (b) which goes ON for a prescribed period of time from the rise of the input signal and the output signal (c) which turns ON for a prescribed period of time from the fall of the input signal. The length of time T from the rise of the input signal shown as (a) till the fall of the same may be varied by circuit X-4 so that the length of time from a start of operation of the initiation magnet MG4 till a start of operation of the setting magnet MG1 can be controlled at will.

FIG. 13 shows the circuit arrangement in the camera main body as a block diagram, where functional circuits of the camera not directly related to the purport of the present invention are omitted to avoid a complicated explanation.

In this drawing, enclosed by broken lines is a light sensing computation circuit Y-1 and also enclosed by broken line is a circuit Y-2 that serves to produce an aperture control signal. What is shown as Q80 is a transistor to control power for the light sensing computation circuit Y-1, which is turned ON and OFF by a light sensing switch SW1 connected through a resistor R80.

Transistor Q81 controls a power source supply for the aperture control signal producing circuit Y-2, and is turned ON and OFF by a release switch SW2 connected through a resistor R82. A light sensing switch SW1 and a release switch SW2 are switches which go ON in response to pressing down of a release button (not shown in the drawing), with the light sensing switch SW1 first going ON in the half pressed state (first step) of a release button, then the release switch SW2 turning ON in the fully pressed state (second step) thereof. The terminal 8b, to which the terminal 16b of FIG. 11 is connected, is connected to the light sensing switch SW1. The positive terminal of a battery EC, which serves as the power source of the camera, is connected to the above-mentioned transistors Q80, Q81, while its minus terminal is connected to the terminal 8a in turn connected to the terminal 16a of FIG. 11. Further, the minus terminal of the battery is also connected to each switch through ground. A switch SW3 which is connected between the terminal 8e and ground (the minus terminal of the battery EC) turns ON upon completion of an exposure and turns OFF upon completion of a wind up action.

What is shown as Y-15 is the aperture information resistance on the aperture information resistance substrate 111 explained in FIG. 2, while Y-16 is an aperture signal brush equivalent to the aperture signal brush 107 in FIG. 2. The information from the aperture information resistance Y-15 is introduced into a second operating unit Y-9 through the change over switch 129. Member 129 is the change over switch described in the explanation of the mechanism of FIG. 2, wherein during an AE exposure (a shutter time preference automatic exposure) the contacts c and a are connected and information from the aperture information resistance Y-15 is introduced into the second operation unit Y-9. Also, during an aperture preference automatic exposure contacts c and b are connected, and the aperture information resistance Y-15 as the set aperture value information is introduced into a first operation unit Y-8 (not shown in the drawing). The light sensing computation circuit Y-1 enclosed broken lines includes a light sensing amplifier Y-3 composed of a known type of a logarithmic compression circuit to perform TTL light sensing of the brightness of an object wherein a photo-diode is connected to an input terminal thereof and a log-diode is connected to a feed back circuit thereof. What is shown as Y-4 is an information source TV which produces a voltage corresponding to a set shutter time entered with a shutter time setting dial (not shown in the drawing). Member Y-5 is a film sensitivity information source SV to produce a voltage corresponding to a set film sensitivity, while Y-6 is an information source Avo variable in correspondence with the fully open value of an exchangeable lens for producing a voltage corresponding to a fully opened value of the lens, and member Y-7 is an information source Avc to correct a photosensing error near a fully opened aperture for producing a voltage corresponding to the Avc. These information sources are composed of variable resistors. A first operation unit Y-8 receives an output Bvo of the photosensing amplifier and each one of the input information sources Tv, Sv, Avo, Avc to perform an operation Bvo+Avo+Avc+Sv−Tv=Av for producing an aperture value Av. In the aperture control signal producing circuit Y-2, what is shown as Y-10 is a comparator which receives an output of the abovementioned first operation unit Y-8 and an output of the second operation unit Y-9. An output of the comparator Y-10 is connected to the terminal 8d and to an initiation magnet Y-12 of the camera. A switch circuit Y-11 controls initiation and stopping of the comparator Y-10, and is turned ON and OFF by an output of a discriminating circuit Y-13 which detects whether a terminal voltage of the terminal 8e is high or low. What is shown as R84 is a pull up resistor. The second operation unit Y-9 receives the fully opened value Avo and an aperture information resistance value Y=15 (ΔAv) as inputs for performing an operation Avo+ΔAv=Av. The aperture information resistance value Y-15 (ΔAv) comes from a sliding resistance housed within the camera's main body. The unit Y-9 corrects the aperture information to a value corresponding to the fully opened value of the exchangeable lens mounted at that time.

FIG. 14 shows an example of the switch circuit Y-11 and the discriminating circuit Y-13 in FIG. 13. Here the unit Y-11 is composed of a switching transistor and the Y-13 is composed of an inverter.

An operation of the electric circuits of the present invention is explained with reference to FIGS. 11 to 14.

As explained with respect to FIG. 1, when the electric driving device is mounted on the camera, the respective terminals 8a and 16a, 8b and 16b, 8c and 16c, 8d and 16d, as well as also 8e to 16e are connected. At this time current flows from the battery EC of the camera to the resistors R81→R80→terminals 8b→16b→resistor R51→diode D50→capacitor C50→terminals 16a→8a, and the capacitor C50 which is charged. When the release button is half pressed the switch SW1 in FIG. 13 goes ON and the transistor Q80 in the camera's main body turns ON, and the photosensing computation circuit Y-1 is activated. In the electric driving device, as the switch SW1 turns ON, a discharging current from the capacitor C50 flows through the base emitter circuit of the transistor Q50, the resistor R51, the terminals 16b, 8b, the switch SW1 and the terminals 8a, 16a, and the transistor Q50 goes ON. When the transistor Q50 goes ON, the transistor Q51 turns ON to supply base current of the transistor Q50 through the resistor R52, the diode D51 and at the same time power is supplied to the constant voltage diode D52 and the transistor Q52 through the resistor R53. As the transistor Q51 goes ON, a constant voltage is produced by the constant voltage circuit X-3 and charging of the capacitor C51 and of the capacitor C52 is started through the resistor R57 and the diode D54, and through the resistor R58 and the diode D55, respectively. The transistor Q55 turns ON while the charging current is flowing to the capacitor C51, prohibiting the operation of the transistor Q54, the transistor Q53 is turned OFF and the terminal 16c set at a high level. When the voltage at the capacitor C51 increases and becomes close to the output voltage of the constant voltage circuit X-3, the current flowing through the resistor R57 reaches its smallest value and the transistor Q55 is turned OFF. When the transistor Q55 is turned OFF, the transistor Q54 is turned ON by the base current flowing through the resistor R56, and the transistor Q53 which is connected to the transistor Q54 through the resistor R54 is also turned ON. Here, if the switch SW1 is turned OFF, the terminal 16b is placed in an opened state and the transistors Q50, Q51 and the transistor Q52 which produces a constant voltage are turned OFF. Therefore even if the capacitor C51 has its charging completed the transistors Q54, Q53 are turned OFF.

Therefore, the transistor Q53 becomes ON when the switch SW1 is ON and the constant voltage circuit X-3 is in operation. Further each circuit including the signal separation circuit X-4 is in operative state and the charging of the capacitor C51 is completed.

The effect of turning ON of the transistor Q53 is introduced into the discriminating circuit Y-13 of the camera's main body through the terminals 16c, 8c. When the release button is pressed further from the half pressed state, the release switch SW2 goes ON and the transistor Q81 is also turned ON. As the transistor Q81 is turned ON, power is supplied to the aperture control signal producing circuit Y-2. Then, since the terminal 8c goes to a low level as the transistor Q53 goes ON as mentioned above, the discriminating circuit Y-13 determines that the magnet control circuit X-2 of the electric driving device has completed its operational preparation to produce a high level of placing the transistor of the switch circuit Y-11 in ON state. Here, if the transistor Q53 has been placed in OFF state by some reason, the switch circuit Y-11 remains in OFF state and each operation to be described below will not proceed and the camera stops an operation.

As the above-mentioned switch circuit Y-11 becomes ON, the comparison circuit Y-10 starts operating and first, produces a high level signal as shown by (a) of FIG. 12 (FIG. 13). That is, since the resistance Y-15 is at an initial position, producing a low level at an initial state, the output of the operational circuit Y-9 is at a lower level than the output of the operational circuit Y-8. Therefore, the output of the comparator circuit Y-10 when said circuit starts operation is at a high level. Said signal is introduced into the transistor Q58 through the terminals 8d, 16d. When a signal is introduced into the transistor Q58, the transistor Q57 is turned ON by an operation of the signal separation circuit X-4 as explained in FIG. 12, and the initiation magnet MG4 is actuated. By the actuation of the initiation magnet the AE mechanism is actuated as explained above, and the aperture signal brush Y-16 starts sliding over a plane of the aperture information resistance Y-15. Varying value of said aperture information resistance is added to the fully opened value Avo at the second operation unit Y-9, then the outputs of said second operation unit Y-9 which varies from time to time are compared at the comparator Y-10 with the outputs of the first operation unit Y-8 computed from the photosensed value and each of set input information. And when the output levels of the output Av of the first operation unit Y-8 and of the output of the second operation unit Y-9 match with each other, the output of the comparator Y-10 changes from a high level to a low level, therefore the transistor Q58 is turned OFF, and the transistor Q56 is turned ON by the signal separation circuit X-4, to activate the setting magnet MG1. As said initiation magnet MG4 and the setting magnet MG1 are activated, an aperture corresponding to an appropriate aperture value computed by the first operation unit is set at the camera main body. Next, the initiation magnet Y-12 of the camera main body is activated by the signal of the output of the comparator which has changed from a high level to a low level to effect a stop down operation for the aperture and a mirror up, thus a shutter running is done. When an exposure is completed the switch SW3 becomes ON by a known method not being shown in the drawing (for example the switch SW3 is made to associate with a running of a follower shutter screen). (At this time, it is supposed that the power source switch SWP is in ON state). When the switch SW3 is turned ON, the emitter of the transistor Q60 of the wind up control circuit X-1 is connected to the minus terminal of the battery through the terminals 16e, 8e, the switch SW3, and terminals 8a, 16a. Since the base of the transistor Q60 is biased by the diodes D60 and D62, the transistor Q60 is turned ON when the switch SW3 is made ON. When the transistor Q60 is made ON, the transistors Q61, Q62 are turned ON and the motor M rotates. The above-mentioned driving disc 201 of the electric driving devices rotates by said rotation of the motor to effect a charging of the AE mechanism and at the same time a wind up of camera film and a shutter charging are effected.

When these wind up operations are completed, the switch SW3 is made OFF and the transistors Q60, Q61, Q63 are turned OFF by a known method (for example the switch SW3 is made to associate with a following shutter screen and is placed in ON state as the follower shutter screen runs and is turned OFF as said wind up is completed). While the motor M tends to continue a rotation by inertia even if the transistor Q62 is made OFF, the transistor Q63 is turned ON by the base current flowing through the resistor R63 to short-circuit both terminals of the motor M, therefore a short-circuiting current flows to a direction to block the rotation of the motor, thus the motor M rapidly stops. If the release button is kept pressing at this time the aperture control by the magnets MG4,MG1 will be done again as mentioned above, then a shutter release of the camera is done, and thus operation will be repeated.

As explained above, in the camera and the electric driving device of the present invention, a circuit, which produces a signal of an operational preparation completion when the AE circuit is in a state as power is supplied thereto by an actuation of a release button and a charging of the driving capacitor for the aperture control magnet is completed, is provided at the electric driving device, and the camera shifts to a next operation after said completion signal is produced, thus an operation of the AE photographing function will be carried out in a sure manner.

Also such arrangement is provided at the camera that a circuit to multiply a control signal to be sent out to the electric driving device and a circuit to separate said multiplied signal into the control signals for magnet driving are provided and a number of signal pins for signal transmission is reduced, thus it is effective as a means to realize in a concrete manner the system of the present invention.

Also, as the magnets are driven by the power source of the electric driving drvice, a responsive characteristic of the magnet becomes to have a high speed and an aperture setting can be done without being affected by a response delay of the magnets, thus correct aperture setting can be done. Also, since the AE mechanism can be driven by a rotating member, an association between the AE mechanism of the camera and the electric driving device can be secured without providing a hole part at a bottom plane of the camera, thus a dust preventive characteristic and a waterproof characteristic can be enhanced.

What is claimed is:

1. A camera system, comprising:
   (A) a camera, including:
   (a) a release operation member;
   (b) an automatic exposure mechanism to set an aperture opening;
   (c) a signal forming circuit which shifts an output state from a first state to a second state in response to an operation of the release operation member, and at the same time changes said output state from the second state to other states when the aperture opening set by the automatic exposure mechanism reaches a prescribed value; and
(d) a terminal to send out an output of said signal forming circuit; and
(B) a motor drive device, including:
(a) a terminal which can be coupled with said terminal of the camera;
(b) a separation circuit, which detects a state of output from the signal forming circuit being introduced through said terminal, and forms a first signal when the output state of the signal forming circuit changes from the first state to the second state, and forms a second signal when the output state of said circuit changes from the second state to other states;
(c) a transmission mechanism which has driving means for driving the automatic exposure mechanism by charged force therein, and transmits the driving force of said driving means to the automatic exposure mechanism for effecting an aperture setting action by the automatic exposure mechanism; and
(d) electromagnetic means for actuating said transmission mechanism in response to the first signal and at the same time stops an operation of the transmission mechanism in response to the second signal.

2. A motor drive device useable with a camera which comprising an automatic exposure mechanism to set an aperture opening, a signal forming circuit which has its output state shifted from a first state to a second state in response to an operation of a release operation member and has the output state thereof changed from the second state to other states when the aperture opening set by the automatic exposure mechanism reaches a prescribed value, and a terminal to send out an output of said circuit, said motor drive device comprising:
(a) a terminal which can be coupled with the terminal of the camera;
(b) a separation circuit which detects a state of an output from the signal forming circuit being introduced through said terminal and forms a first signal when the output state of the signal forming circuit changes from the first state to the second state and forms a second signal when said output state changes from the second state to other states;
(c) a transmission mechanism which has driving means for driving the automatic exposure mechanism by charged force therein, and transmits the driving force of said driving means to said automatic exposure mechanism for effecting an aperture setting action by the automatic exposure mechanism; and
(d) electromagnetic means for actuating the transmission mechanism in response to said first signal and for stopping the action of the transmission mechanism in response to the second signal.

3. A camera system according to claim 1 or a camera and motor drive device according to claim 2, in which the electromagnetic means includes first magnet means for responding to the first signal and second magnet means for responding to the second signal.

4. A camera system comprising:
(A) A camera, including:
(a) a release operation member;
(b) first switch means for conducting as the release operation member is shifted from a rest operating state to a first operating state;
(c) a light measuring circuit of having power supplied thereto through said first switch means;
(d) an automatic exposure mechanism to set an aperture based on an output of the light measuring circuit;
(e) second switch means for being shifted from a first state to a second state as the release operation member is shifted from the first operating state to a second operating state; and
(f) signal forming means for forming an initiation signal and a termination signal, said means being arranged to operate as the second switch means moves to the second state;
(B) a motor drive device, including:
(a) connector means coupleable to a power source;
(b) a first capacitor;
(c) a second capacitor;
(d) magnet means for initiating said automatic exposure mechanism by impressing a charge accumulated at said first capacitor thereto and terminating the operation of the automatic exposure mechanism by impressing a charge accumulated at the second capacitor thereto;
(e) a constant voltage circuit connected to a power source;
(f) third switch means for forming power supply paths to supply power to the first and second capacitors to the voltage of the constant voltage circuit as the release operation member is shifted from a rest operating state to a first operating state;
(g) magnet control means for impressing the charge accumulated at the first capacitor to the magnet means in response to an initiation signal and impressing a charge accumulated at the second capacitor to the magnet means in response to the termination signal; and
(h) prohibition means for prohibiting an operation of the signal forming means until the charging of the second capacitor reaches a prescribed level.

5. A camera system, comprising:
(A) a camera, including:
(a) a release member;
(b) an automatic exposure mechanism to set an aperture opening; and
(c) a rotating coupling member at a bottom plane of the camera, wherein the automatic exposure mechanism effects an aperture opening setting action by a rotation of said rotating coupling member; and
(B) an electric driving device to perform a film wind up action; including:
(a) a second rotating coupling member at a coupling plane of the device with the camera and can be coupled with the rotating coupling member of the camera;
(b) spring means charged by the film wind up action; and
(c) a driving force transmitting member to rotate said second rotating coupling member by a charging force of said spring means, said transmitting means being actuated by an operation of the release member.

6. A camera system according to claim 5, wherein the driving device has magnet means arranged to be activated by a release operation for initiating the transmitting member and, at the same time, for stopping the rotation of the second rotating coupling member;

a motor for carrying out a film windup operation, and connector means connectable to a driving power source to drive said motor and to operate as a power source for the magnet means.

7. A camera system according to claim 6, wherein said camera system includes an aperture signal forming circuit to form an aperture signal and an aperture control circuit to effect aperture control by the automatic exposure mechanism based on the aperture signal and, at the same time, form a completion signal when the aperture control is completed, and wherein the magnet means is arranged to be activated in response to said completion signal for stopping the rotation of the second rotating coupling member.

8. An electric drive device usable with a camera having a bottom plane, a release member, an automatic exposure mechanism to set an aperture opening, and a rotating coupling member at the bottom plane of the camera to effect an aperture opening setting action with the automatic exposure mechanism upon rotation of the rotating coupling member, comprising:

(a) a motor to perform a film windup action or a shutter charging action;

(b) means forming a coupling plane with the camera;

(c) a second rotating coupling member at the coupling plane of the device with the camera coupleable with the rotating coupling member of the camera;

(d) spring means arranged to be charged by the film windup action or shutter charging action to produce a charging force; and (e) a driving force transmitting member to rotate said second rotating coupling member with a charging force of said spring means, said transmitting means being arranged to be actuated by an operation of the release member.

9. A camera system comprising:

(A) a camera including:

(a) an automatic exposure mechanism to set an aperture opening; and (b) a rotating coupling member at a bottom plane of the camera for causing the automatic exposure mechanism to effect an aperture opening setting action in response to a rotation of said rotating coupling member; and (B) an electric drive device to perform a film windup action or shutter charging action, including:

(a) a motor for actuating a camera operation;

(b) means forming a coupling plane with the camera of the device with the camera;

(c) a second rotating coupling member at the coupling plane of the device with the camera and coupleable with the rotating coupling member of the camera;

(d) spring means charged by the camera operation actuated by the motor; and (e) a driving force transmitting member responsive to a release operation of the camera to rotate said second rotating coupling member with the charging force of said spring means.

10. A system as in claim 9, wherein the camera action is a film windup action.

11. A system as in claim 9, wherein the camera action is a shutter charging action.

12. An electric drive device usable with a camera having an automatic exposure mechanism to set an aperture opening and a rotating coupling member provided at a bottom plane of a camera to perform an aperture opening setting action with the automatic exposure mechanism by a rotation of the rotating coupling member, comprising:

(a) a motor to effect a camera charging action;

(b) a second rotating coupling member at a coupling plane of the device with the camera coupleable to the rotating coupling member of the camera;

(c) spring means charged by the camera charging action; and (d) a driving force transmitting member to rotate said second rotating coupling member by a charging force of said spring means, said transmitting means being responsive to a release operation of the camera.

13. A device as in claim 12, wherein said camera charging action is a film windup action.

14. A device as in claim 12, wherein said camera charging action is a shutter cocking action.

* * * * *